March 5, 1968  S. E. S. TORUDD  3,372,077
METHOD OF MANUFACTURING PACKAGES
Filed Aug. 5, 1963
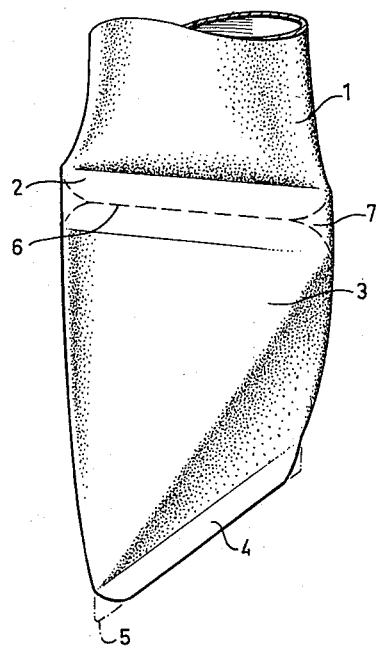
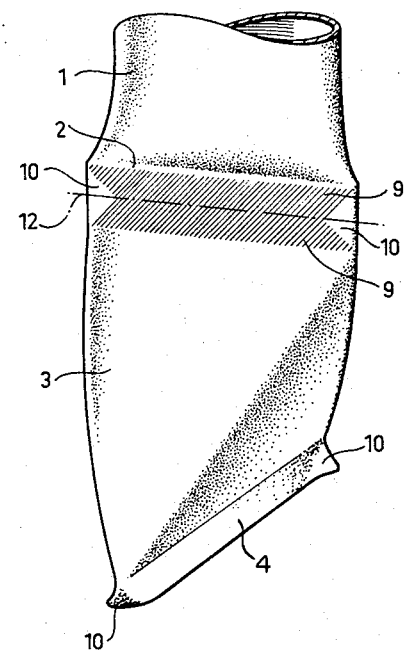
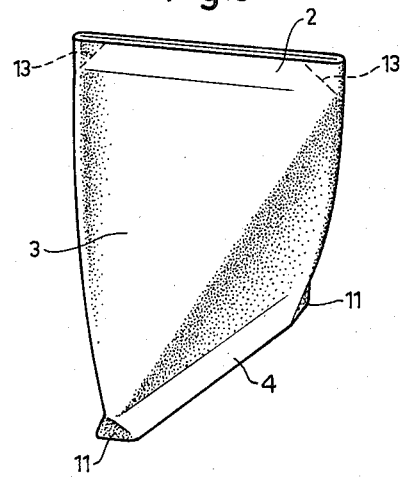
INVENTOR
Stig Erik Sigvard Torudd
BY Pierce, Scheffler & Parker
ATTORNEYS

United States Patent Office 3,372,077
Patented Mar. 5, 1968

3,372,077
METHOD OF MANUFACTURING PACKAGES
Stig Erik Sigvard Torudd, Palsjovagen 13,
Lund, Sweden
Filed Aug. 5, 1963, Ser. No. 299,731
Claims priority, application Sweden, Aug. 8, 1962,
8,645/62
1 Claim. (Cl. 156—198)

The present invention relates to a method of manufacturing tetrahedron shaped packages of the type obtained when a tubular blank of relatively stiff material is sealed off by means of flat-pressing and heat sealing in relatively narrow, rectangular zones perpendicular to the tube axis and successively angularly displaced, whereafter the tube is cut into individual packages by means of cuts through the mentioned rectangular flat-pressed zones.

The above mentioned, modern packaging method has proved to be very rational and in addition the packages made in accordance therewith are both inexpensive and hygienic. It has been found that the flat-pressed sealing fins which as a result of the welding procedure have obtained double material thickness and thereby a considerable material stiffness form such sharp and stiff corners that difficulties may arise in connection with transport of the packages in paper packing, for example bags of paper which easily may get damaged by the sharp, projecting corners of the sealing fins.

These disadvantages of the packages in question will be avoided through the present invention which is characterized therein that the free corners of the flat-pressed sealing fins formed in the sealing and cutting operation are effectively blunted.

The mentioned process, resulting in a blunting, may be effected in many different ways which in the following are described with reference to the enclosed drawing, in which FIG. 1 shows a filled and sealed package still attached to the tube, FIG. 2 shows the heat sealing area of a filled and sealed package, and FIG. 3 shows a filled and sealed tetrahedron shaped package cut off from the tube.

The tube shown on FIG. 1, which is coated on the inside with a thermoplastic material, has through flat-pressing been sealed at its bottom end in zones 2 and 4 perpendicular to each other and perpendicular to the tube axis, whereby the tetrahedron shaped body 3 is formed. In order to obtain the required shape of the sealing fins 4, i.e. a rounding of the corners, the separating operation is effected with a cutting device on which the cutting member is so formed that the cut lines will run along the broken lines with curved ends marked with 6. Thereby the part marked with 7 will be entirely cut away and removed. The described method of separation therefore results in an elimination of the sharp corners of the sealing fins at the same time as the separating operation is effected.

Similarly on FIG. 2 the tube is at its bottom end formed into a tetrahedron shaped package 3 where through succesive flat-pressing operations it is heat sealed in zones 2 and 4 perpendicular to each other. By reasons of a special construction of the sealing jaws it is possible to ensure that the heat sealing is not effected over the whole flat-pressing area 2, but only along an end-curved sealing area 9 indicated by oblique parallel lines. As the corner area 10, which have not been heat sealed, on the outside of the area 9 have considerably less stiffness than the heat sealed areas, the corner areas 10 of the sealing fins 2 and 4 will, after the tetrahedron has been separated from the tube 1 through a cut along the broken line 12, be effectively blunted, and thereby the initially mentioned difficulties will be avoided.

The tetrahedron 3 shown on FIG. 3, which is made in the same way as the tetrahedrons shown on the previous figures, is sealed along the entire area of the rectangular sealing fins 2 and thereafter separated from the tube through a straight cut. The blunting of the corner part 11 of the tetrahedron is in this case achieved by processing the tetrahedron immediately after the cutting-off operation in such a way that the corner parts 11 of the sealing fins 2 are folded along the broken line 13 whereby the inconvenience of the sharp projecting corners is removed.

Thus the above described invention indicates a way of improving a product by simple means through the elimination of certain drawbacks attaching to same. The methods described herein of applying the invention have proved particularly advantageous and economical. This, however, does not preclude the possibility of other ways, within the frame of the invention idea, of applying the present invention.

I claim:
1. A method of manufacturing tetrahedron shaped packages from a tubular blank of relatively stiff material comprising the steps of: supplying said tubular blank of relatively stiff material to a forming zone, forming a first seal in said tubular blank by flat pressing and heat sealing said blank in a relatively narrow rectangular zone and leaving a V-shaped unsealed area at each end of said seal, forming a second seal above and at an angle to said first seal in said tubular blank by flat pressing and heat sealing and blank in another relatively narrow rectangular zone leaving V-shaped unsealed areas at the ends of said second seal, severing said second seal substantially in the center thereof after sealing, and blunting the unsealed V-shaped areas in said first and second seals.

References Cited

UNITED STATES PATENTS

| 2,195,740 | 9/1940 | Salfisberg | 53—28 |
| 2,784,540 | 3/1957 | Jarund | 53—180 |
| 2,800,163 | 7/1957 | Rusch | 156—253 |
| 3,090,175 | 5/1963 | Berglund | 53—28 |
| 1,820,124 | 8/1931 | Dorogi et al. | 156—251 XR |
| 2,437,884 | 3/1948 | Maynard | 156—251 XR |
| 3,078,201 | 2/1963 | Christie | 161—146 |

EARL M. BERGERT, *Primary Examiner.*

H. P. EPSTEIN, *Assistant Examiner.*